(12) United States Patent
Pramberger

(10) Patent No.: US 7,987,240 B2
(45) Date of Patent: Jul. 26, 2011

(54) DYNAMIC DATA ACCESS IN A COMPUTER SYSTEM VIA REMOTE SERVICES

(75) Inventor: Johann Pramberger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/121,318

(22) Filed: May 15, 2008

(65) Prior Publication Data
US 2008/0288609 A1    Nov. 20, 2008

(30) Foreign Application Priority Data
May 16, 2007   (EP) .................................... 07108303

(51) Int. Cl.
*G06F 15/16*   (2006.01)
(52) U.S. Cl. ...................................................... 709/217
(58) Field of Classification Search ........... 709/217–219
See application file for complete search history.

(56) References Cited

U.S. PATENT DOCUMENTS

| | | | | |
|---|---|---|---|---|
| 6,889,234 | B1 * | 5/2005 | Li et al. ......................... | 707/203 |
| 2002/0026500 | A1 * | 2/2002 | Kanefsky et al. ............. | 709/219 |

* cited by examiner

*Primary Examiner* — Wing F. Chan
*Assistant Examiner* — David X Yi
(74) *Attorney, Agent, or Firm* — Dennis Jung

(57) ABSTRACT

The present invention relates to the field of network computing. In particular, it relates to a method and respective system for providing access for an application program to remote resources located in an electronic computer network, wherein said application program is implemented on a computer residing in said network. A mechanism is provided to enable local running application programs to dynamically use URL-addressed data in the Internet or an Intranet without any change in their program source code.

12 Claims, 7 Drawing Sheets

See Edocumentation of tool at http://www.httpunit.org/doc/dependencies.html
The dependencies below points to a repository with entries using the structure
http:/<repository>/<group>/<artifact>/<version>/<artifact>.<version>.<type>.
<dependencies pathId="base.classpath">
    <dependency group="rhino"      version="1.5R4.1"/>
    <dependency group="junit"      version="3.8.1"/>
    <dependency group="nekohtml"   version="0.9.1" unless="use.jtidy"/>
    <dependency group="servletapi" version="2.3"  />
    <dependency group="jtidy"      version="4aug2000r7-dev" if="use.jtidy"/>
    <dependency group="xerces"     version="2.2.1" artifact="xmlParserAPIs"/>
    <dependency group="xerces"     version="2.0.0" artifact="xercesImpl"/>
</dependencies>
<javac srcdir="src" destdir="classes">
    <classpath refid="base.classpath"/>
</javac>
Example of remote link path defined in the above example to be shadowed into a local cache is
http://www.ibiblio.org/maven2/xerces/xerces/2.2.1/

FIG.4

See http://www.rgagnon.com/javadetails/java-0150.html
which provide a sample code snipped that shows access
for different underlying operating systems using the native shell service
```
public class ReadEnv {
public static Properties getEnv Vars() throws Throwable {
 Process p=null;
Properties envVars=new Properties();
Runtime r=Runtime,getRuntime():
String OS=System.getProperty("os.name").toLowerCase();
//System.out.println(OS);
  if (OS.indexOf("windows9")>-1) { p=r.exec("command.com/c set");}
else if ((OS.indexOf("nt")>-1)
||(OS.indexOf("windows 2000")>-1)
  ||(OS.indexOf("windows xp")>-1)) {
//thanks to JuanFran for the xp fix!
 p=r.exec("cmd.exe /c set" );   }
else {
// our last hope, we assume Unix (thanks to H. Ware for the fix)
 p=r.exec("env");
 }
BufferedRader br=new BufferedReader
(new InputStreamReader(p.getInputStreeam()));
String line;
while({line=br.readLine()) !=null) {
int idx=line.indexOf('=');
String key=line.substring(0, idx):
String value=line.substring(idx+1);
envVars.setProperty(key, value);
// System.out.printli(key+"="+value);
 }
return envVars;
```

FIG.5

```
See http://comments.gmane.org/gmane.comp.jakarta.ant.devel/36417
public static synchronized Vector getProcEnvironment() {
    if (procEnvironment !=null) {
        return procEnvironment:
    }
procEnvironment = new Vector();
 //use Java5 funtionality to get environment
    if
(JavaEnvUtils.getJavaVersion().equals(JavaEnvUtils.JAVA_1_5)) {
    procEnvironment.addAll(System.getenv().entrySet());
        return procEnvironment:
    }
```

FIG.6

DYNAMIC DATA ACCESS IN A COMPUTER SYSTEM VIA REMOTE SERVICES

FIELD OF THE INVENTION

The present invention relates to the field of network computing. In particular, it relates to a method and respective system for providing access to remote resources for an application program via remote services.

BACKGROUND

FIG. 1 gives an overview over prior art system architecture.

The overall system 1 comprises a remote computer 3 and a local computer 2 with a network connection through network services 4.

A local computer 2 is a system which executes application programs 21 and host access to a file 2511 on a file system 25.

An application program 21 is to be understood as an executable file on the local computer 2 which needs access to files through environment variable definitions. Therefore, it calls so-called environment variable access services 211.

With such prior art technology it is possible to access data from a local file system by an application program running on a local computer. It is also possible to transparently access even data from a remote computer through the local file system management which is mounted to it. So, the present invention addresses all application programs or systems which do not care about network access today and just rely on local data access from their specific point of view.

With the increasing use of the Internet the need to transparently access data beyond the scope of mounted file system arises. If data resides on the Internet or even in the Intranet data is normally not available through such file sharing mechanism for several reasons and can often only be accessed via browser based services using URL locations. This however is disadvantageous because many application programs do not have a Browser functionality incorporated with them.

SUMMARY OF THE INVENTION

One objective of the present invention is to provide a mechanism for local running application programs which enables them to dynamically use also URL-addressed data in the Internet or an Intranet without any change in their program source code. This objective of the invention is achieved by the features stated in enclosed independent claims. Further advantageous arrangements and embodiments of the invention are set forth in the respective subclaims. Reference should now be made to the appended claims.

The present invention uses the idea that a programmer can define through some environment variables the URL location to be searched and that the operating system when encountering the read of the environment variables provides the associated data for local access, such that an application program referring to the environment variable search path does not know if the data is found on the URL location or through the traditional file system layer.

A programmer skilled in the art is able to put the required URL definitions into the environment variable. The URL definitions follow the official URL standards which include a file, HTTP, FTP or other access mechanisms. As implied by the handling of environment variables according to prior art the operating system has the task to provide the access to the location, the operating system provides respective services to the application program which uses the inventional form of an environment variable. Further below, those services are called "remote data access service" and "remote data provider service", on the local and the remote computer system, respectively.

A preferred implementation of such service which is transparent to an application program includes the idea of creating a new type of environment variable which can be defined as a "dynamic variable". The processing of such new variable can be either defined in a system provided configuration field which can be implemented specific for the operating system in use, or a new reserved system environment variable such as "dyn vars" can be created which lists just the dynamic environment variables. An example can be:

Dyn vars=x_path (1 min), y_path (10 min), z_path (6 h); the time indications are the default refresh times after which a URL is checked again and is eventually updated.

An alternative method discloses to define a reserved posed or prefix indicator to a variable in order to mark a variable as dynamic. Examples could be:

x_path (1 min)=http://svn.apache.org/viewvc/ant/core/trunk/src/resources/ or y_path ( )=http://svn.apache.org/viewvc/unt/core/trunk/src/resources, where the refresh time is a default setting.

A variable defined as "dynamic" triggers the operating system to create a so-called shadow area for each URL which contains the data references by the URL. Thus, a kind of shadow pool storage area can be created which will by synchronized on a predefined time interval, referred to as "refresh" time. As seen above the synchronization parameter may be also implemented as a part of the definition, the variable is a dynamic variable. The location of the shadow storage pools is defined somewhere within the operating system configuration. In addition a file system listener may be activated which detects access to files in such shadow pool area. If so then this may trigger the update of the requested file or files from the remote location instead of the regular interval. This would allow a consistent local cache to the remote sources.

The advantage thereof is that when an application program reads the environment variable the URL can be replaced by the shadow location on the file system, which is thus transparent for the application program. So, as a person skilled in the art, may appreciate, the source code of an application program does not need to be changed, when the inventional features are to be implemented.

A further implementation of the inventional method includes to provide new services for accessing the information encoded by such environment variable, which allows to the operating system to search for a file in a search path which, if the path is found, also makes the file accessible for read access. By this method an application program is then enabled to query on request the URL resource just in time, find i.e. locate the file for example as indicated by a directory location, and, if requested, even makes the file locally accessible. The location of the requested resource is just a verification if the URL is a valid URL and if a real resource is found behind such definition. The actual access to the remote data involves then a download from the URL location to a local area (shadow area as described above) for enabling an access of the program through prior art access methods which are now redirected to point to the download path. So, the application program only defines the environment variable containing the URLs and the members to access and will get back then the real location of the member in the file system. The verification of the URL and the download itself are then services performed by the underlying operating systems which are hidden to the application program.

According to the most basic aspect of the present invention as claimed further below, a method for providing access to remote resources for an application program performed by a part of the operating system of a network-connectable computer, preferably performed by an "extended environment variables manager", is disclosed, which is characterised by the steps of:
a) scanning the values of environment variables of said application program for the occurrence of an URL notation,
b) invoking a remote function for accessing an URL found in said scanning procedure in order to request a remote resource associated with said URL,
c) storing said remote resource in a pre-allocated cache memory section,
d) listening to the access of the pre-allocated cache memory to make sure the most current data is stored in the cache memory if not an update will be initiated.

Preferably, the remote resource is selected from the group of:
a) one or more files stored in a remote file system,
b) one or more directories containing files in a remote system,
c) repositories or databases holding information that can be stored as local file instances.

Preferably, the basic method can be extended by a sequence of steps as follows:
a) if a URL location is found in said scan step above, checking if a local cache memory section exists which is allocated for the remote resource associated with said URL notation,
b) in case no memory section exists, allocating a respective section, and storing said remote resource a local cache memory section,
c) in case an allocated memory section exists, storing said remote resource at said local cache memory section.

Further, a second component, e.g. an environment variable value provider performs the method for providing access to remote resources for an application program via an environment variable, which is characterized by the steps of:
a) in response to a request from an application program requesting the value of an environment variable,
b) scanning the environment variables value for a URL notation,
c) if a URL notation is found replace said URL notation by a reference pointing to the cache memory section
d) initiate and file system listener for the cache memory to verify consistency to remote data location.

The before mentioned environment variable manager and environment variable value provider cooperate quite closely by using an appropriate operational programming interface. The controller works preferably asynchronically to the runtime of the application program and provides the respective URL data. At the runtime of a compiled and executable application program the environment variable is read by the provider component which forwards at least the cache copy of the data generated by the controller program in the file cache, if it is not available, a respective error message is issued.

BRIEF DESCRIPTION OF THE DRAWINGS

The present invention is illustrated by way of example and is not limited by the shape of the figures of the drawings in which:

FIGS. 4, 5, and 6 show sample implementations of certain aspects used by the invention.

DETAILED DESCRIPTION OF THE INVENTION

Figure 2:
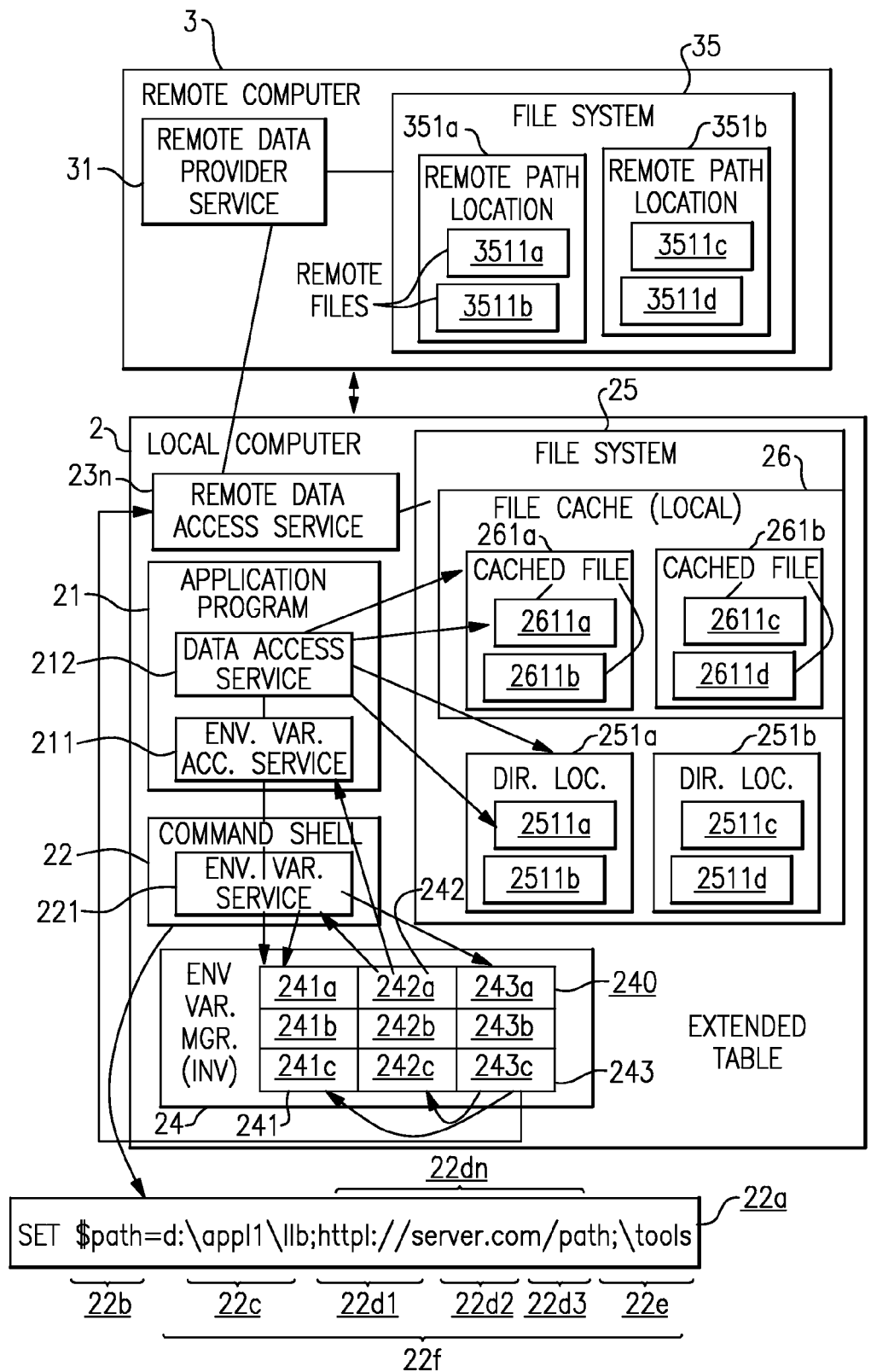
FIG. 2 illustrates the most basic structural components of a inventional hardware and software environment used for a preferred embodiment of the inventional method.

With general reference to the figures and with special reference now to FIG. 2 the structural and functional components as used in a preferred embodiment of the invention are described. Some of them are used as existing in prior art, others are modified in order to comply with the requirements of typically inventional functionality and structure.

FIG. 2 gives a system description.

The overall system 1 comprises a remote computer 3 and a local computer 2 with a network connection through network services 4.

A local computer 2 is a system which executes application programs 21 and host access to a file 2511 on a file system 25.

Figure 1:
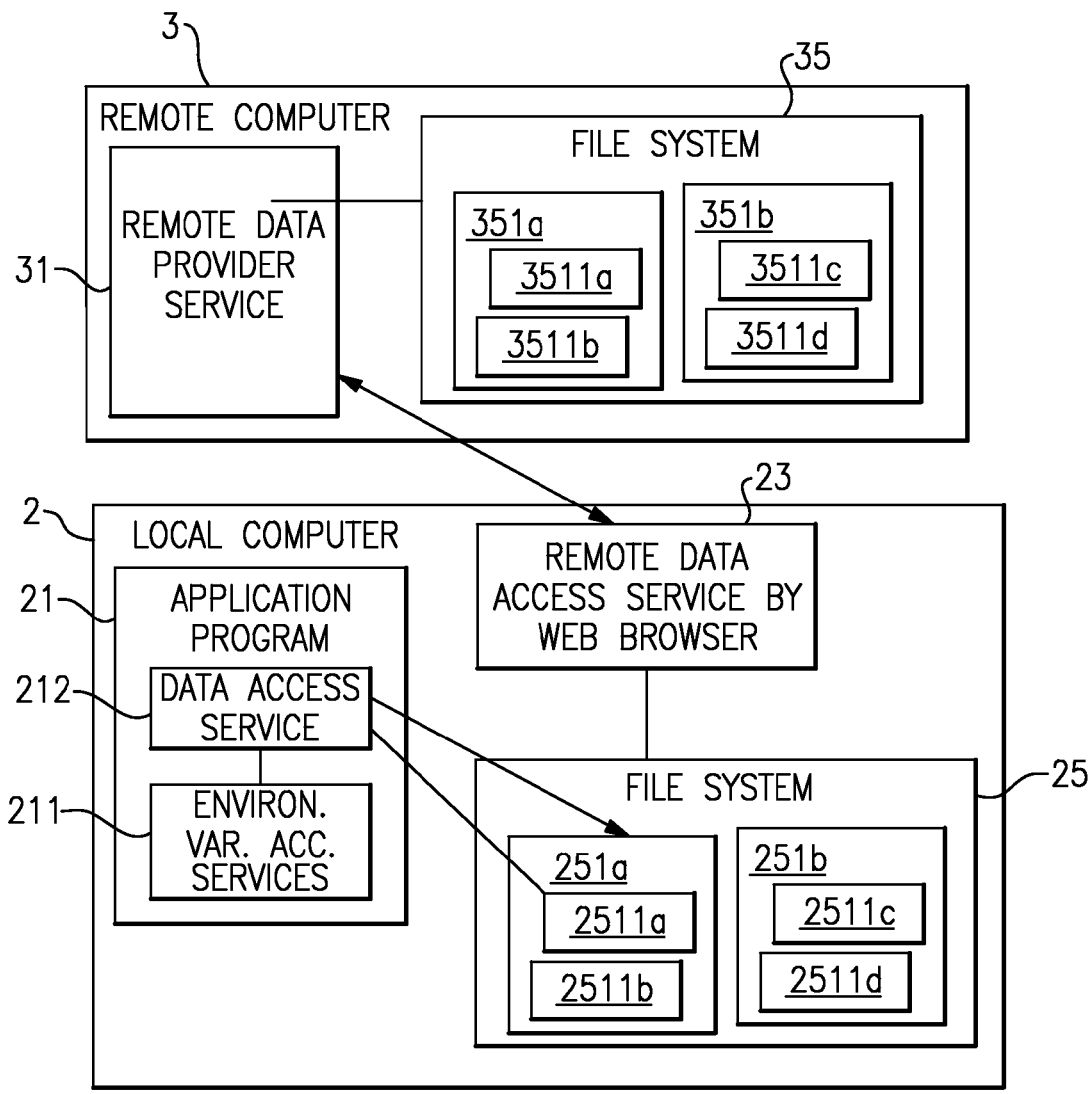
FIG. 1 illustrates the most basic structural components of a prior art hardware and software environment used for a prior art method.

An application program 21 is to be understood as an executable file on the local computer 2 which needs access to files through environment variable definitions. Therefore, it calls so-called environment variable access services 211. In so far, this corresponds to FIG. 1.

With reference to environment variable access services 211, there are given further below several sample access methods in various programming languages which allow retrieving the content of environment variables for further processing by the application program. For environment variables pointing to file location information a data access service may be called to retrieve files from the specified location path.

An essential element of a prior art application program is the so-called Data access service 212.

This section of the application program will get the location path information as a sequence of data location specification which may typically come from environment variables, or alternatively from application invocation parameters. Based on this input the application will try to get access to the content of one or more files potentially located in the given location search path. So, for each path the service will try to access the file and if it is found, the content of the file will be referred, or if it is an output location a file may be written to. If a file system 25 listener is active then this may even trigger a update of created files to a remote system if this configured and access right are given.

A Command Shell 22 is a further component of the local computer's 2 operating system, which represents the interface to its user to define and change an environment variable definition 22a by a keyword and an associated value 242. The entered format it passed to a so-called environment variable manager 24 for purpose of internal representation.

Also requests to display a stored environment variable will come through the Command Shell 22 where it will request the information of the environment variable or variables and display them in its presentation space.

The implementation of the command shell 22 depends on the operating system; there might be even different versions available for the same operating system.

WINDOWS and UNIX have a similar way treating environment variables while IBM z/OS for example works differently. However, regarding the aspect of file specifications through keyword references there is a high degree of similarity. On IBM z/OS one can specify either through the command shell time sharing option (TSO) or through the Batch submission system JES via JCL a DDNAME which allow to define a keyword known to the calling application program and a sequence of data sets names (which correspond to file paths in WINDOWS or UNIX).

An Environment Variable Definition Command 22a shows a command and its syntax to define an environment variable to the application environment provided by the underlying operating system through a command shell environment. The definition can be done through various ways. A user may type-in the command in a command shell. The command can be executed through shell scripts. A GUI interface may be provided to enter the environment variable definition.

An Environment Variable keyword 22b represents the name of the environment variable used in the application program to refer to the associated value.

A file system path 22c may be directed to a local location; an example is given in the drawing to specify a directory path which may map to the directory location 251a of the local system 2.

A file system path 22d may be directed to a remote location; an example is given in the drawing to specify a directory path which may map to the remote directory location 351a which is part of the local file system 2 through a file share access via a remote data access service 23 and the remote data provider service 31 of the remote computer 3.

A file system path 22e may be directed to a local location; an example is given in the drawing to specify a directory path which may map to the directory location 251b.

An Environment Variable value 22f is given in the drawing to comprise elements 22c, 22d, and 22e. The content of an environment variable keyword to be referred to from an application program through the keyword. The format of the value is not strictly defined. It can be of any string. However, for specifying path and file locations a special syntax has been established where an application program can rely on, and which allows to define a path as a path list where each path is separated in windows through a ';', wherein in UNIX the ':' is used. A system defined variable is the path variable to hold the location of an executable program file to be searched when it is called in the command line window for execution.

Other common variables are classpath for a Java Virtual Machine or lib to contain dynamic calls. Also definitions for help files, include files for compilers and other file related variables do exist. On IBM z/OS the concept of a DDNAME is used to locate to a name a path of datasets to be searched. In this way a DDNAME can be seen as an environment variable with a key/value pair. The mechanism to define the variable is different but the concept is the same.

An Environment variable user service 221 is a service as part of the command shell of an operating system having the functionality to define and retrieve the environment.

A Remote file access service 23 implements a method which allows requesting data from a remote data provider through a file server in order to mount remote file storage to the local file system 25. A file listener may be associated to enable a life update of files accessed or created by application program 21.

An Environment Variable Manager 24 will manage the list of defined environment variables entered and modified through service 211 or service 221.

An Environment variable table 240 contains the key-value pairs of pre-defined environment variables. In reality there might be several tables with different scopes for a multi user system, or one table works for all users and others are private for each individual users. Manager 24 then will create a search path through the tables for the same environment variable if needed.

An Environment variable key 242 will represent an environment variable keyword in the list to represent an associated value located in column 242 of table 240.

An Environment variable active value 242 will represent the actual environment variable value associated to a column 241 that gets used by an application program 21 through service 211.

A file system 25 provides the permanent storage location for files in the local computer system 2 and a file system listener for changes and access to the shadow pool area.

A path location 251 provides the location of the files to be stored within the file system 25.

A file 2511 contains the permanent data to be stored in the file system 25 at a defined path location 251a or 251b.

A remote computer 3 is connected to the local computer 2 through a network connection 4 which allows to transfer file data between the two file systems 35 and 25, respectively.

A remote data provider 31 is a service on the remote computer 3 that allows to access files from a local computer 2 through the local file system 25 access layer in the way that the remote data is virtually seen as local data. Examples of such services are LAN share, AFS, NFS or SAMBA.

The remote file system 35 plays the same function on the remote system 3 as does the file system 25 on the local computer 2.

The remote path locations 351a 351b have the same function on the remote system 3 as the path location 251a, b have on the local computer 2. The same is true for the remote files 3511a-d.

Network services 4 are prior art methods to allow the communication and data transfer between a remote data provider 31 and a remote data access service 23.

The command 22 shell is extended according to the invention by additional services to retrieve not only the traditional format by also the entered value of environment variable definition command 22a. It may also extended by services to allow a further configuration for an extended table 240 to define caching intervals and caching locations for individual remote references.

Note that for the invention the traditional command shell is relevant, however for user interaction to define, modify and display environment variables, alternate user interfaces such Graphical User interfaces (GUI) may be provided as alternative to the command shell. However, those will interact in the similar way to table 24 as the Command Shell will do with table 24 as it exists in prior art.

For a preferred embodiment of the invention implemented in IBM z/OS Operating system the prior art concept and utility of the DDNAME will be extended as described.

An Environment variable user service 221 is a service as part of the command shell of an operating system having the functionality to define and retrieve the environment.

A Remote file access service 23 implements a method which allows to request data from a remote data provider through a file server in order to mount remote file storage to the local file system 25.

An Environment Variable Manager 24 will manage the list of defined environment variables entered and modified through service 211 or service 221.

An Environment variable table 240 contains the key-value pairs of pre-defined environment variables. In reality there might be several tables with different scopes for a multi user system, or one table works for all users and others are private for each individual users. Manager 24 then will create a search path through the tables for the same environment variable if needed.

An Environment variable key 242 will represent an environment variable keyword in the list to represent an associated value located in column 242 of table 240.

An Environment variable active value 242 will represent the actual environment variable value associated to a column 241 that gets used by an application program 21 through service 211.

A file system 25 provides the permanent storage location for files in the local computer system 2 and a file system listener for changes and access to the shadow pool area.

A path location 251 provides the location of the files to be stored within the file system 25.

A file 2511 contains the permanent data to be stored in the file system 25 at a defined path location 251a or 251b.

A remote computer 3 is connected to the local computer 2 through a network connection 4 which allows to transfer file data between the two file systems 35 and 25, respectively.

A remote data provider 31 is a service on the remote computer 3 that allows to access files from a local computer 2 through the local file system 25 access layer in the way that the remote data is virtually seen as local data. Examples of such services are LAN share, AFS, NFS or SAMBA.

The remote file system 35 plays the same function on the remote system 3 as does the file system 25 on the local computer 2.

The remote path locations 351a 351b have the same function on the remote system 3 as the path location 251a, b have on the local computer 2. The same is true for the remote files 3511a-d.

Network services 4 are prior art methods to allow the communication and data transfer between a remote data provider 31 and a remote data access service 23.

Remote Data Access Service 23:

This implementation is part of the inventional method and allows to request data from a remote data provider service 31 (see below for details) through a URL notation and associated network services and to write it to a local cache 26. This is typically a read only procedure from remote and a write to local cache 26. However, dependent on the specified protocol given to the manager 24 it may also trigger an update of data from the cache back to the specified URL.

File Cache 26:

The file cache 26 is part of the local file system and its location is in the local filesystem somehow predefined or configured through manager 24. Attributes to the caching may be also defined through 2.4 such as interval of caching or actions of the file system listener to either update the cache with files from the remote file system 35 or write created files to the remote file system 35 if so defined.

A file cache path 261, and cached files 2611a,b,c,d are defined as known from prior art.

Remote Data Provider 31:

This is a service on the remote computer 3 that waits for remote request through an URL request to provide the requested data of the file system of the server.

Network Access Mechanism 4 Via URL:

This provides the communication and data transfer mechanism defined through a given URL and coordinated by service 23n on the local computer and 31 on the remote computer.

URL format 2.2d.n is a part of the path specification.

This shows the URL format now replacing the former path specification to access data via different protocols such as http://, https://, ftp:// and even file://.

An URL schema or protocol 22d1 defines the method to be used to access the data specified via elements 22d2 and 22d3, wherein URL server 22d2 defines the server location holding the data, and URL data location information 22d3 provides the information to access the remote data.

It is transparent to the user where the data really exists.

On the server side the services 23n and 31 are then responsible to map the string into the real data location on the server to bring it to the local file system.

The inventional Environment Variable Definition Command 22a with an URL differs from prior art command 22a in the way that now the specification of an URL is treated in a special way.

Different implementations may choose respective different ways to trigger a treatment of an environment variable definition if an URL occurs. Command 22a may create a special indicator in the keyword to identify the treatment such as "$path= . . . ". There may also be a separate configuration process to identify explicitly the environment variable to be treated in the special way or even strings in the values to be treated special or any combination.

According to this embodiment, an Environment Variable Manager 24 is extended somehow as described as follows:

The extended manager 24 will take the pre-defined environment variable definition command 22a by the environment user service 221 and parse it into environment variable keyword 22b, file system path 22c, and 22d. Those elements will be entered into newly created entries 243abc of the thus extended table 240.

Each of these entries 243 will now be investigated if a remote data access format is found like seen in the command 22a. If so, then a request will be passed to the inventional version 23n of the remote data access service in order to cache the referenced file or files in this file location specification to the local cache 26.

The entry location of the local cache 26 is then entered into table entries 242a,b,c.

Assume that the inventional command 22a is part of the prior art command, then entries 241a,b,c are stored in entries 243a,b,c.

The inventional environment variables manager 24, however, will replace entries 241a,b,c by the corresponding file cache location 262. If all remote references are replaced within command 22a, then the new command 22a containing only references to local file system paths will be stored into entries 242a,b,c for actual use by the application program 21 and commandshell Beside this basic mapping the inventional manager 24 may hold additional configuration values such as default caching intervals and caching location. It may also hold for special remote access specification such as command 22a specific caching location and caching intervals and other needed attributes for optimized management.

Typically the specified URL points to a read only location so that only caching from remote to local would be initiated to the inventional version of the remote data access service 23

If, however, the URL also allows a write function, then additional information for authentication may be available to the inventional manager 24 to initiate then an update request to the inventional service 234 to synchronize the cache to the remote location.

Extended Environment Variable Table 240:

This table 240 has basically the same structure and function as described as for element 240 above. The only differences are that a third column 243 is added to distinguish between the entered value in the new column 243 and the used value in the already existing column 242. In prior art the used column is always the same as the pre-defined column.
Extended Definition 243 of Environment Variables:

This will according to this embodiment represent the externally defined value which will then be parsed by manager 24 for remote references of a format such as given by reference sign 22d1, 22d2, or 22d3. Dependent on the given administrative solution to identify the special treatment it will then also parse and format the environment keyword to the conventional expected keyword to be stored and found under entries 241a,b,c.

Manager 24 will then initiate the caching of the remote files and add the local file location of the cached files into entry 242a,b,c so that the application program 21 can access the data defined as remote data transparently with traditional local access methods.

Based on the functions as described above the inventional method will be described in addition to the foregoing by a control flow description as follows and with reference to FIG. 3:

With respect to the objective noted in the end of prior art discussion above instead of using the location information that is pointing to a remote server through the local file system, the access through an URL is implemented herein as follows:

Before the application is started the environment variable must be set in a step 310 with an appropriate value by issuing command 22a to the command shell 22. The command in a concrete example may be "SET $path=c:\appll\lib;protocol://server/path;c:\tools"

In a next step 315 the command shell will pass the value 22f to the environment variable user service 221.

In a next step 320 the environment variable user service 221 will give the environment variable definition 22b and 22f to manager 24 (see FIG. 2); in our example "$path=c:\appll\lib;protocol://server/path;c:\tools"

Manager 24 will store the definition statement into column 243 of table 240, in a step 325.

Manager 24 will then parse out the key and the value in a step 330 and store them into environment variable table 240 in a step 335. For the key it will get "$path" and for the value "c:\appll\lib;protocol://server/path;c:\tools"

The key goes into column 241 in step 335. It may include some reformatting to the expected key value in the traditional format. In the exemplary case the "$" is stripped off and the value stored into entry 241a is "path".

If a decision 240 yields that the key value indicated no special treatment of URL notations, then the parsed value is stored in a step 345 into entry 242 and the work is done.

If it had the treatment marker—in our case the key starts with a "$"—then the value string is parsed down in a step 350 to identify the path elements which are in the sample case separated by ";". So the filesystem paths 22c, 22dn and 22e.are identified. Each of them is checked if it contains an URL definition such as in the sample case the URL definition 22dn, leading to a plurality of decisions 355.

For each of the detected URLs the following steps will be performed in the YES branch of decision 355:

Pass the URL in a step 360 to the remote data access service 23n which handles the access of the remote data.

This service 23n will now forward the request to the remote data provider service 31 located on the remote system 3, in order to get the files within the URL location from its file system 35, step 360.

An example for such a process is shown next below:
Example to access data from a CVS library via http See documentation of tool at
http://cvsgrab.sourceforge.net/
Example of data access
cvsgrab -url
http://cvs.apache.org/viewcvs.-cgi/ant/?only_with_tag=ANT_16BRANCH In the present example with the URL http://server.com/path will point to a directory location 351a.

Service 23n gets now all the files from service 31 such as in the example the files 3511a and 3511b, step 365 and stores them in a step 370 into the local cache 26 at the location 261a resulting into the files 2611a and 2611b. It may be implemented to optimize this download procedure by finding out that files are still in sync or identify those who changed.

The returned cache path 261a is now used in a step 375 to replace the URL definition in the environment variable value 22f.. In the example "http://server.com/path" gets replaced by "d:\cache\srv\pathx".

Dependent on the implementation the environment variables manager 24 may now trigger an update 380 of the cache through the service 23n in pre-defined intervals. This is an endless loop that also gets started with each startup of the local computer.

If a decision 385 yields that all detected URLs are processed the value 22f of the environment variable under analysis will have no URLs but instead will comprise corresponding local file paths. So the string "c:\appll\lib; http://server.com/path;c:\tools" is transformed to "c:\appll\lib;d:\cache\srv\pathx;c:\tools". This string becomes now the environment variable for use and will therefore be stored into entry 242b, see step 395.

| ... | ... | |
|---|---|---|
| path | c:\appll\lib;d:\cache\srv\pathx;c:\tools | $path= c:\appll\lib; http://server.com/path; c:\tools |
| ... | ... | |

If URLs get redefined, i.e. modified or deleted from the value section 22f, then the old URL will be "cleaned up" which means the update request in step 380 above gets stopped and the related cache gets deleted.

In the NO-branch of decision 385 control is fed back to step 360 in order to re-enter the loop body for processing the next URL.

Figure 3A:
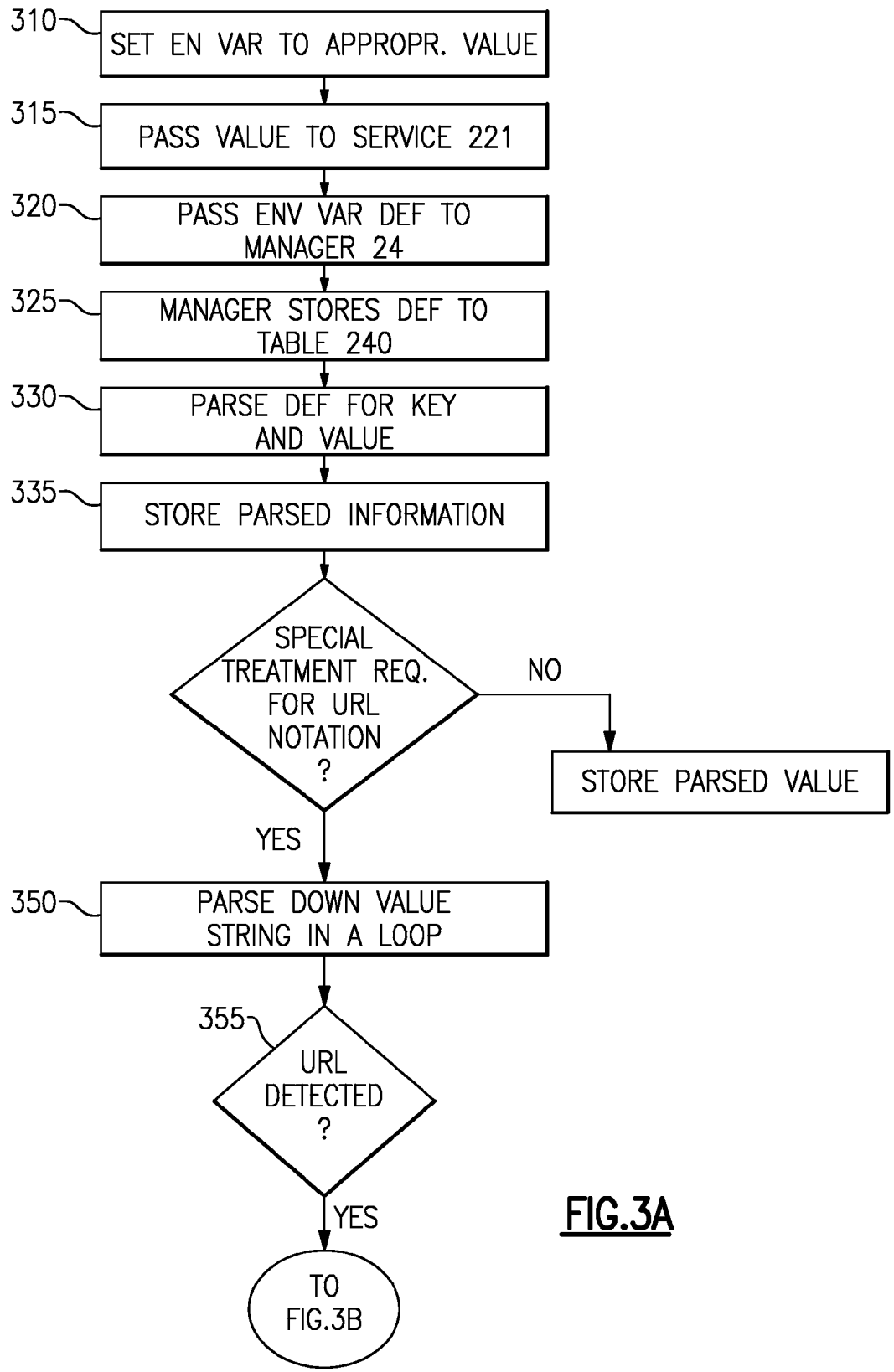
FIGS. 3A and 3B illustrate the control flow of the most important steps of a preferred embodiment of the inventional method.
Figure 3B:
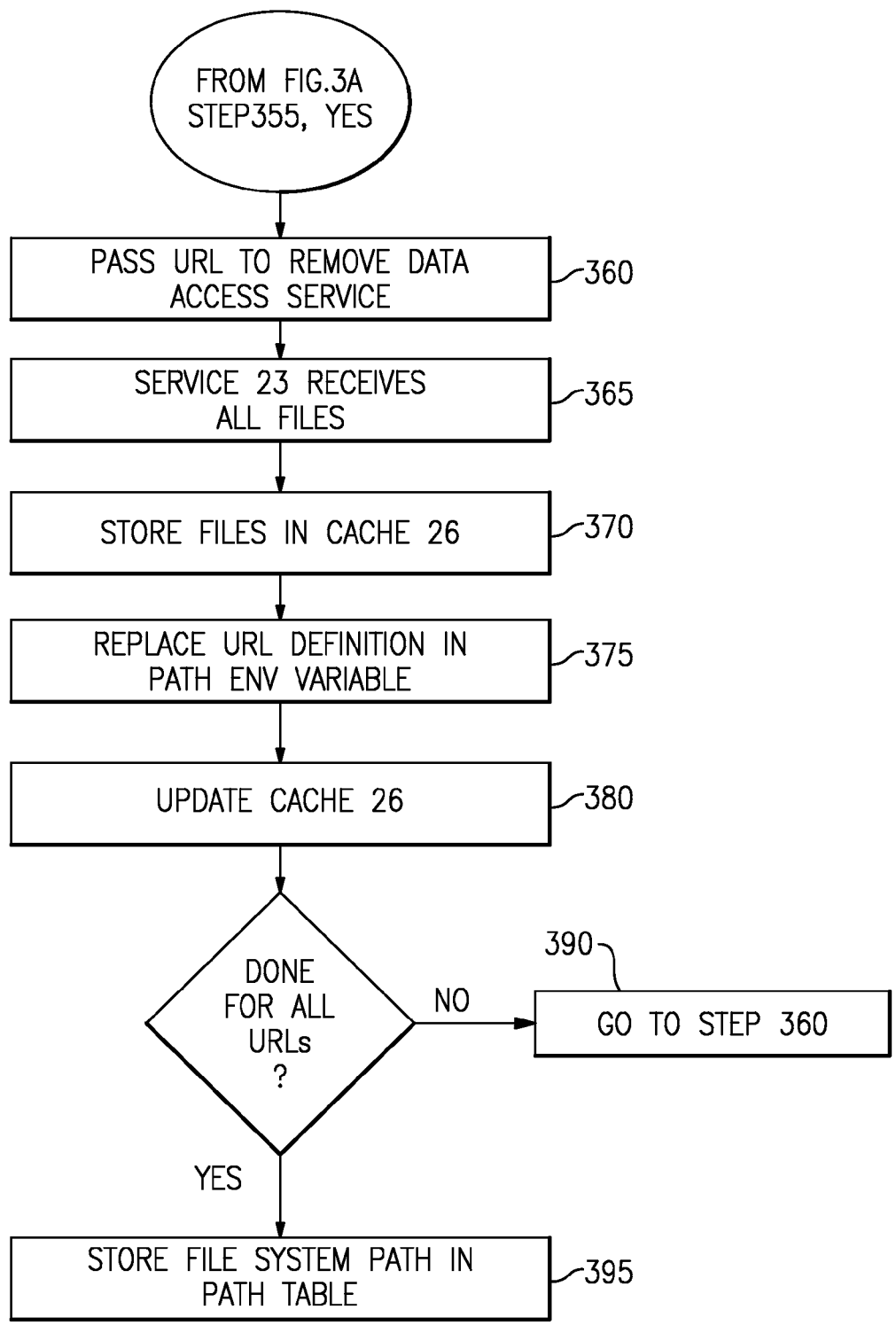

The control flow used in the inventional method for Retrieving environment variable content by the application program 21 follows the scheme as given in FIGS. 3A and 3B, because the application program 21 has the same interface to manager 24 and gets only path location pointing to the local file system.

In particular, an application running on the local computer system can be invoked with parameters to define its behaviour each time on invocation. However, it is convenient to provide standard invocation parameters sometime through environment variables so that the system can read them out after invocation. For this reason each application has a defined set of environment variables to be set before invocation which it will used to get their content for further processing.

The application issues one of the methods described above. So with the present example the application program calls for the value of "path".

It now gets back the value of the environment variable. In the sample case the value is c:\appl1\lib; d:\program2\includes;c:\tools.

The same holds true for the control flow which is performed by the application program 21 when it access the file data, because the application 21 only gets local file system location formats from manager 24 and does not ask for the real location of the data, per se only reachable via URL request.

It should be noted that this is in some sense independent of the actual usage of the environment variable. The application must just somehow get a string with the file paths to search for. And this could be either through environment variables or parameter passing or other methods or even any combination to get such a search path. The application 21 is typically written that it has no knowledge where the data actually resides. It just assumes that it needs access to the local file system component and does not have to provide network services by itself.

With the given search path the application is now looking for a file to use and issues a service by its own or some existing service to access each path in sequence given in the search path and to test if the file exist. Note that for the application it is transparent if the file is on a remote server or not because this is handled through the local filesystem.

If the file is found then the path is found and the content of the file can be read or the file can be treated in the way the application wants.

Finally, some sample implementations are given for the purpose of completeness of the disclosure:

An example to access files from a http repository into a local cache is given in FIG. 4.

FIG. 5 shows a Java code sample for an environment variable access service 211.

FIG. 6 shows a standard API for accessing environment variables.

An environment variable user service 221 is given by the following code sample for a Windows command shell program:
Create environment variable entries:

```
SET INCLUDE=C:\Program Files\ObjREXX\API
SET TEMID=wuclientde
SET LIB=C:\Program Files\ObjREXX\API
```

A sample for listing an environment variable in command shell is:
SET INCLUDE

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method to be performed by a part of the operating system of a computer for providing access for an application program to data of remote resources located in an electronic computer network, wherein said application program is implemented on a computer residing in said network, the method comprising:
   scanning the values of environment variables of said application program for the occurrence of an URL notation;
   invoking a remote function for accessing an URL found in said scanning procedure in order to request a remote resource associated with said URL;
   storing said remote resource in a pre-allocated cache memory section for providing access to said resource;
   verifying the content of the pre-allocated cache memory section on regular intervals or through file system event listener to initiate update from or to a remote file system;
   checking if a local cache memory section exists which is allocated for the remote resource associated with said URL notation;
   if no cache memory section exists, allocating a respective section of the local cache memory section and keep it current through scheduled updates or through an file system event listener; and
   if an allocated memory section exists, storing said remote resource at said local cache memory section.

2. The method according to claim 1, wherein if said stored remote resource is requested to be accessed a further time, accessing said stored resource instead of said remote resource.

3. The method according to claim 1, wherein said remote resource is selected from at least one file stored in a remote file system.

4. The method according to claim 1, wherein said remote resource is selected from at least one directory containing files in a remote system.

5. The method according to claim 1, wherein said remote resource is selected from repositories or databases holding information able to be stored as local file instances.

6. A method for providing access to remote resources for an application program via an environment variable, the method comprising:
- requesting the value of an environment variable in response to a request from an application program;
- scanning the environment variables value for a URL notation;
- replacing said URL notation by a reference pointing to the cache memory section;
- synchronizing the cache memory section with a remote file system;
- checking if a local cache memory section exists which is allocated for the remote resource associated with said URL notation;
- if no cache memory section exists, allocating a respective section of the local cache memory section and keep it current through scheduled updates or through an file system event listener; and
- if an allocated memory section exists, storing said remote resource at said local cache memory section.

7. An electronic data processing system implemented for providing access for an application program to remote resources located in an electronic computer network, wherein said application program is implemented on a computer residing in said network, said system being adapted to perform a method comprising:
- scanning the values of environment variables of said application program for the occurrence of an URL notation;
- invoking a remote function for accessing an URL found in said scanning procedure in order to request a remote resource associated with said URL;
- storing said remote resource in a pre-allocated cache memory section for providing access to said resource and keeping it current through scheduled updates or through an file system event listener;
- updating said remote resource from the pre-allocated cache memory section for providing access to said resource;
- checking if a local cache memory section exists which is allocated for the remote resource associated with said URL notation;
- if no cache memory section exists, allocating a respective section of the local cache memory section for the remote resource associated with said URL; and
- if an allocated memory section exists, storing said remote resource at said local cache memory section.

8. A computer program product for providing access for an application program to remote resources located in an electronic computer network, wherein said application program is implemented on a computer residing in said network, said computer program product comprising a non-transitory computer useable medium including a computer readable program, wherein the computer readable program includes a functional component that when executed on a computer causes the computer to perform the steps of:
- scanning the values of environment variables of said application program for the occurrence of an URL notation;
- invoking a remote function for accessing an URL found in said scanning procedure in order to request a remote resource associated with said URL;
- storing said remote resource in a pre-allocated cache memory section for providing access to said resource and keeping it current through scheduled updates or through an file system event listener;
- storing said created resource in a pre-allocated cache memory section to said remote resource;
- checking if a local cache memory section exists which is allocated for the remote resource associated with said URL notation;
- if no cache memory section exists, allocating a respective section of the local cache memory section for the remote resource associated with said URL; and
- if an allocated memory section exists, storing said remote resource at said local cache memory section.

9. The computer program product according to claim 8, wherein the computer readable program includes the functional component that when executed on a computer causes the computer to further perform the step of replacing said URL notation by a reference pointing to the pre-allocated cache memory section.

10. The method according to claim 1, further comprising replacing said URL notation by a reference pointing to the pre-allocated cache memory section.

11. The electronic data processing system according to claim 7, wherein the system being further adapted to replace said URL notation by a reference pointing to the pre-allocated cache memory section.

12. The electronic data processing system according to claim 7, wherein the system being further adapted to access said pre-allocated cache memory section instead of said remote resource associated with said URL.

* * * * *